United States Patent [19]

Ross, deceased

[11] 3,920,403

[45] Nov. 18, 1975

[54] METHOD OF DESORBING GOLD FROM ACTIVATED CARBON

[75] Inventor: J. Richard Ross, deceased, late of Salt Lake City, Utah, by Maza C. Ross, administrator

[73] Assignee: The United States of America as represented by the Secretary of the Interior, Washington, D.C.

[22] Filed: Feb. 1, 1974

[21] Appl. No.: 438,906

[52] U.S. Cl.................................. 204/110; 75/118
[51] Int. Cl.$^2$..................... C22B 11/00; C25C 1/20
[58] Field of Search................... 423/25, 29, 30, 31; 75/105, 106, 118, 108; 204/110

[56] References Cited
UNITED STATES PATENTS
981,451   1/1911   McKechnie...................... 75/101 R 2,493,396   1/1930   Farber et al. ......................... 75/118

OTHER PUBLICATIONS

Bureau of Mines Report of Investigations 4843, Zadra et al., Feb., 1952, pp. 1, 3–5, 7, 16, 21–23.

Primary Examiner—Oscar R. Vertiz
Assistant Examiner—Brian E. Hearn
Attorney, Agent, or Firm—Roland H. Shubert; Donald R. Fraser

[57] ABSTRACT

Gold in the form of its cyanide complex is desorbed from activated carbon by contacting the carbon with a stripping liquid at temperatures above that 130°C but below the decomposition temperature of the gold cyanide complex. The stripping liquid may comprise water, dilute caustic or dilute caustic cyanide.

7 Claims, 2 Drawing Figures

METHOD OF DESORBING GOLD FROM ACTIVATED CARBON

BACKGROUND OF THE INVENTION

Since its introduction in about 1887, cyanidation has been the single most important technique for winning gold from its ores. Crushed ore is leached with an alkaline cyanide solution to form a gold cyanide complex. Gold may then be recovered from the cyanide leach solution in a variety of ways. It may be precipitated by another metal, such as zinc, and this method has long been practiced. Gold may be recovered by electrolysis of cyanide solutions and this method has also been commercially used.

The gold-cyanide complex may also be removed from the cyanide solution by adsorption on activated carbon which is then separated from the leach solution, stripped of its gold content, and subsequently regenerated by a heat treatment prior to reuse in the adsorption step. Desorption of gold from activated carbon requires the shifting of the equilibrium between adsorption and desorption. Conventional methods of accomplishing the desorption require the contacting of gold-loaded carbon with hot, caustic cyanide solutions. Typically, the caustic cyanide stripping solution is maintained just under its normal boiling point, about 93°C, and is circulated in series arrangement through the carbon bed and an electrolytic cell. Thus, gold is continuously removed from the stripping solution which is recirculated back through the carbon bed. While effective, this technique requires at least 24 hours, with the passage of several hundred bed volumes of solution through the carbon to achieve substantially complete gold recovery.

Such processes are described in the Bureau of Mines Report of Investigations 4672, "A Process for the Recovery of Gold from Activated Carbon by Leaching and Electrolysis" by J. B. Zadra and Report of Investigations 4843, "Process for Recovering Gold and Silver from Activated Carbon by Leaching and Electrolysis" by J. B. Zadra et al.

SUMMARY OF THE INVENTION

Gold adsorbed on carbon in the form of a gold cyanide complex may be desorbed rapidly and completely by performing the desorption at elevated temperatures and pressures using water, dilute caustic or dilute caustic cyanide solutions as stripping fluids. Substantially complete removal of gold from the carbon is achieved using as little as 6 to 10 bed volumes of stripping solution. The desorption may be accomplished at temperatures above about 130°C but below the decomposition temperature of the gold cyanide complex which is about 170°C. In a preferred embodiment, desorption is accomplished at a temperature in the range of 150° to 165°C and at autogenous pressures. It is also preferred to operate an electrolytic cell in series arrangement with the carbon bed so as to continuously recover elemental gold during the desorption and allow recycle of the stripping solution.

Hence it is an object of this invention to recover gold from carbon.

It is a specific object of this invention to speed the desorption of gold from activated carbon and to increase the concentration of gold in the stripping solution.

DETAILED DESCRIPTION OF THE INVENTION

The invention will be more clearly understood from the following description taken with the accompanying drawings wherein.

It has been found that the desorption rate of gold, adsorbed on activated carbon in the form of a gold cyanide complex, increases dramatically as temperature is increased above the normal boiling point of the dilute caustic cyanide solution normally used to strip gold from the carbon. By performing the desorption at elevated temperatures and pressures but below the decomposition temperature of the gold cyanide complex, the following advantages accrue:

1. Time required to recover gold from activated carbon is reduced by a factor of about 10.
2. Gold concentration in the stripping solution is increased by a factor of about 40.
3. Equipment used in the gold recovery operation, such as electrolytic cells, precipitation tanks, pumps and filters may be substantially smaller in size and capacity.
4. Chemical usage in the stripping solutions is greatly reduced.

In this invention, carbon loaded with gold cyanide is introduced into a pressure vessel or column which is adapted to produce or maintain temperatures of up to about 170°C. A stripping solution, which may be water, dilute caustic or dilute caustic cyanide, is then introduced into the carbon bed to desorb the gold cyanide. Equilibrium of gold cyanide between the solution and the carbon bed occurs quickly; in as little as 10 to 20 minutes at 160°C. Desorption of the gold may be accomplished in a batch-type operation or in a continuous fashion. In a batch-type operation, the vessel containing gold-loaded carbon is filled with stripping solution, allowed to equilibrate, and is then removed from the carbon bed and the process is then repeated until desorption is essentially complete. In a continuous operation, gold-loaded carbon is contacted with a flowing stream of stripping solution, preferably in counterflow fashion, at a solution flow rate adjusted to allow achievement of, or approach to, equilibrium between gold in solution and gold adsorbed on the carbon. A continuous, counterflow operation is preferred as this technique requires the least stripping solution and results in the highest levels of gold in the stripping solution.

The level to which gold is loaded on the activated carbon has little effect on the process. Activated carbon used to adsorb gold in the cyanidation treatment of gold ores typically is loaded to levels of about 250 to 1000 troy ounces of gold per ton of carbon. Carbon samples loaded with gold over this general range all responded similarly to the desorption process. Residual gold levels on the desorbed carbon can easily be held to well less than one ounce per ton.

Figure 1:
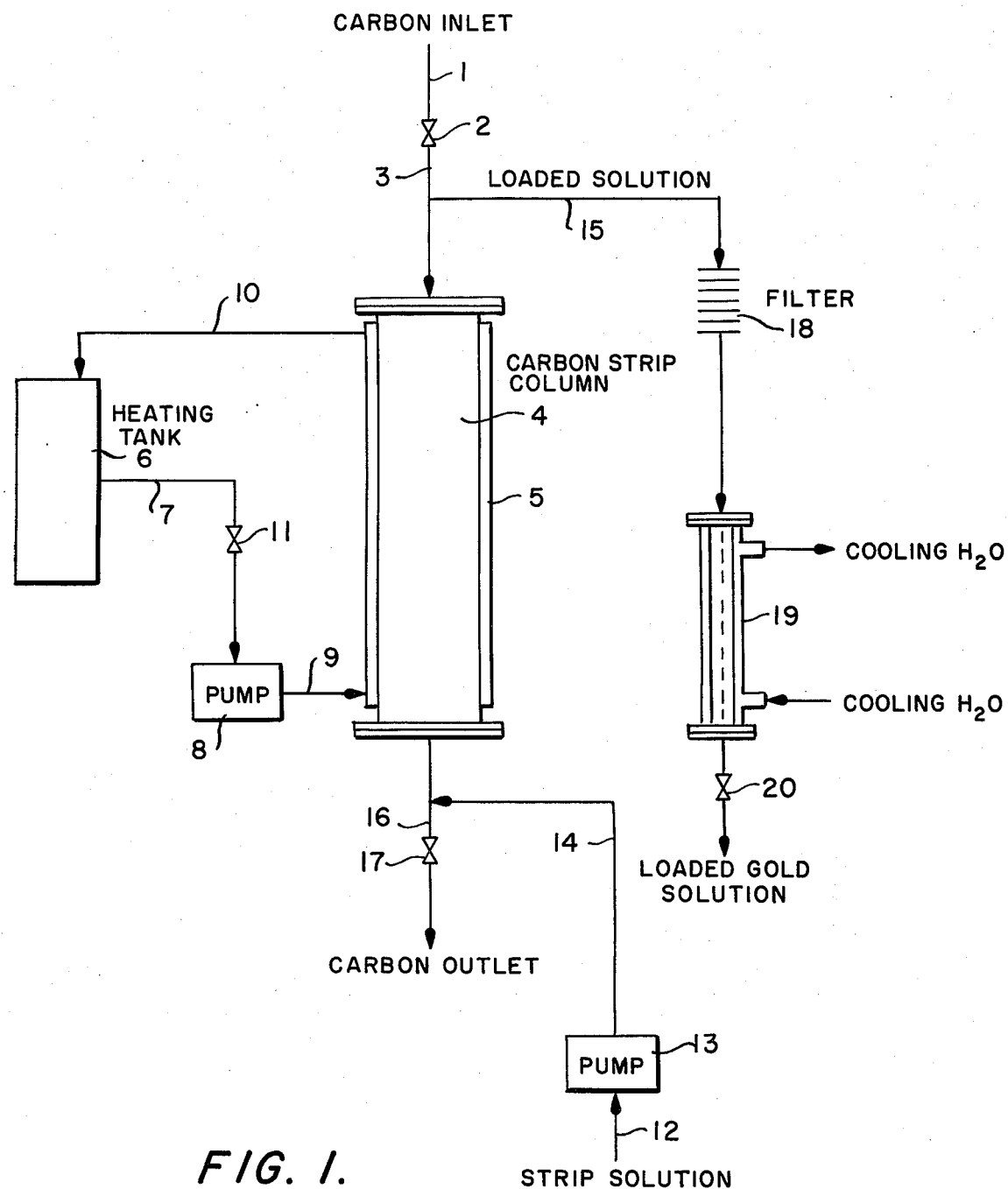
FIG. 1 is a schematic diagram illustrating the inventive process.

Referring now to FIG. 1, there is shown a preferred embodiment of the invention. Gold-loaded carbon 1 is introduced through valve means 2 and conduit 3 into a pressure vessel 4 which is preferably in the form of an upright, elongated cylinder or column. Column 4 is provided with heating means such as jacket 5 through which a hot fluid may be circulated. The hot fluid may be steam or other gas but preferably is a liquid heat exchange medium such as dimethyl silicone. Dimethyl silicone or other liquid medium may be heated in tank 6 by means of a gas burner, electrical immersion heater or other suitable means to the desired temperature and circulated through jacket 5 via conduit 7, pump 8, conduit 9 and return line 10. Temperature of the carbon within column 4 is controlled by the temperature of the liquid medium in tank 6 and additional control may be achieved by other means such as control valve 11 which may be used to regulate the flow of the heat exchange medium.

Stripping solution 12 is pressurized at least to the autogenous pressure developed within column 4 by pump 13 and is passed via conduit 14 in counterflow relationship to the gold-loaded carbon contained in column 4. As the stripping solution passes upwardly through the column, gold desorbs from the carbon and goes into solution. Retention time of the stripping solution within the column should be at least about 10 minutes at 160°C to allow a close approach to equilibrium between gold in solution and that adsorbed on the carbon. Gold-loaded solution is removed from the top of the column via conduit 15 while gold-depleted carbon passes from the bottom of the column by way of conduit 16 and valve means 17. The gold-depleted carbon may then be recycled to a cyanidation process to re-adsorb gold or may be subjected to a thermal regeneration to restore adsorptive activity prior to recycle if necessary.

Gold-loaded solution 15 is then passed to solids-liquid separation means such as filter 18 to remove any suspended carbon particles carried from the column. The solution is cooled to a temperature below its normal boiling point by heat exchange means 19, which may be water cooled as indicated on the drawing, and passed from the desorption process through pressure reducing valve 20. Gold may then be recovered from the cooled solution in a variety of conventional ways but it is preferred to use an electrolytic cell to deposit elemental gold and regenerate the stripping solution for reuse in the process.

Water may be used as the stripping liquid but it is preferred to use dilute aqueous caustic (0.1 to 1.0% sodium hydroxide being appropriate) or dilute aqueous caustic cyanide solutions. Since the carbon was exposed to a dilute caustic cyanide solution during adsorption, water will dissolve caustic and cyanide carried by the loaded carbon in any event. Temperatures of the process must not be allowed to exceed the decomposition temperature of the adsorbed gold cyanide complex. Such decomposition begins at about 170°C with the deposition of elemental gold on the carbon. A preferred desorption temperature is in the range of 150° to 165°C with a most preferred operating temperature being about 160°C.

The following examples serve to more fully illustrate the invention.

EXAMPLE 1

A series of batch equilibrium tests were performed on carbon loaded with adsorbed gold cyanide at various temperatures using a dilute caustic cyanide solution as the desorbing liquid. The following results were obtained:

Table 1

| Temperature °C | Relative Desorption Rate |
| --- | --- |
| 50 | 1 |
| 70 | 3 |
| 90 | 10 |
| 160 | 1200 |

EXAMPLE 2

Samples of carbon loaded with gold cyanide were obtained from three different gold mills. The samples were placed in a cylindrical column which was provided with heating means capable of providing a controlled temperature of the carbon within the column. An aqueous solution of caustic cyanide containing 1.0% sodium hydroxide and 0.1% sodium cyanide was flowed continuously through the column at a temperature of 150°C. Results obtained are as follows:

Table 2

| Gold mill | Loaded carbon oz/ton | Gold stripped, pct. 6-column volumes | 10-column volumes | Gold left on carbon after 10-column volumes, oz/ton |
| --- | --- | --- | --- | --- |
| A | 294 | 95.5 | 99.0 | 3.0 |
| B | 710 | 96.3 | 99.6 | 2.9 |
| C | 920 | 91.8 | 99.9 | 2.6 |

EXAMPLE 3

A sample of activated coconut carbon which had been industrially loaded with cyanide-lime gold-bearing solution to about 560 troy ounces of gold per ton of carbon was split into two parts. One sample portion was stripped of its gold in the conventional fashion using an aqueous solution of 0.1% sodium cyanide and 1.0% sodium hydroxide as the stripping liquid. Desorption of this sample portion was accomplished at atmospheric pressure and a temperature which varied from 88° to 94°C which approximates the normal boiling point of the stripping liquid.

Figure 2:
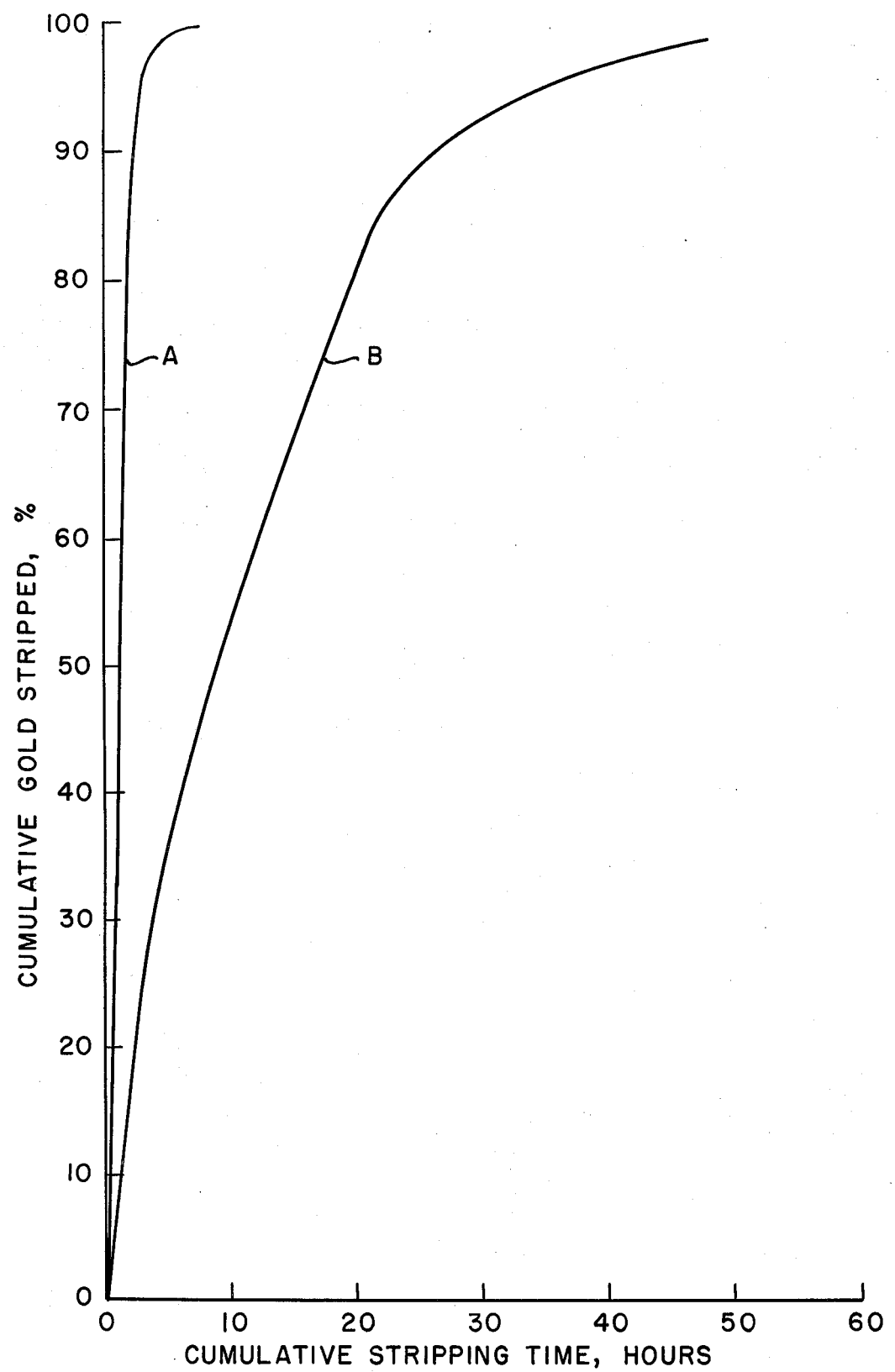
FIG. 2 is a plot of results obtained by use of this invention as compared to prior art techniques.

The other sample portion was desorbed at elevated temperature and pressure; the temperature being maintained within the range of about 130°C to 150°C over most of the stripping cycle. A stripping solution containing 0.4% sodium hydroxide was used in this test. Results are set out in graphical form as FIG. 2 which is a plot of cumulative percentage of gold stripped versus time. Curve A represents results obtained by the practice of this invention while curve B is typical of results obtained by the prior art.

As may be seen from that figure, the rate of gold desorption is dramatically enhanced by use of this invention. At the end of 10.5 hours of stripping, the carbon of curve A assayed 0.35 ounce gold per ton while at the end of 65.5 hours, the carbon of curve B assayed 2.0 ounces.

The data and examples presented herein are illustrative of the benefits derived from practice of this invention. Minor modifications and changes in technique will be obvious to those experienced in the art.

I claim:

1. A method for recovering gold adsorbed on activated carbon in the form of a gold cyanide complex which comprises:

contacting the gold-loaded carbon with a liquid selected from the group consisting of water, dilute caustic, and dilute caustic cyanide at a temperature in the range of 150° to 165°C whereby adsorbed gold cyanide is desorbed from the carbon and goes into solution in the liquid, and recovering dissolved gold from the liquid.

2. The method of claim 1 wherein said liquid is passed in counterflow relationship to the gold-loaded carbon in a pressure vessel.

3. The method of claim 2 wherein dissolved gold is recovered from the liquid by electrolytic means and wherein the gold-depleted liquid is recycled to the desorption step.

4. The method of claim 3 wherein the liquid is a dilute caustic.

5. The method of claim 3 wherein the liquid is a dilute caustic cyanide.

6. The method of claim 3 wherein the gold content of said gold-loaded carbon is in the range of 250 to 1000 troy ounces of gold per ton of carbon.

7. The method of claim 4 wherein said dilute caustic contains from about 0.1 to 1.0% sodium hydroxide.

* * * * *